Oct. 25, 1932.  C. F. WAGNER  1,884,419
MEANS FOR SIMULATING MUTUAL IMPEDANCES
Filed April 11, 1929
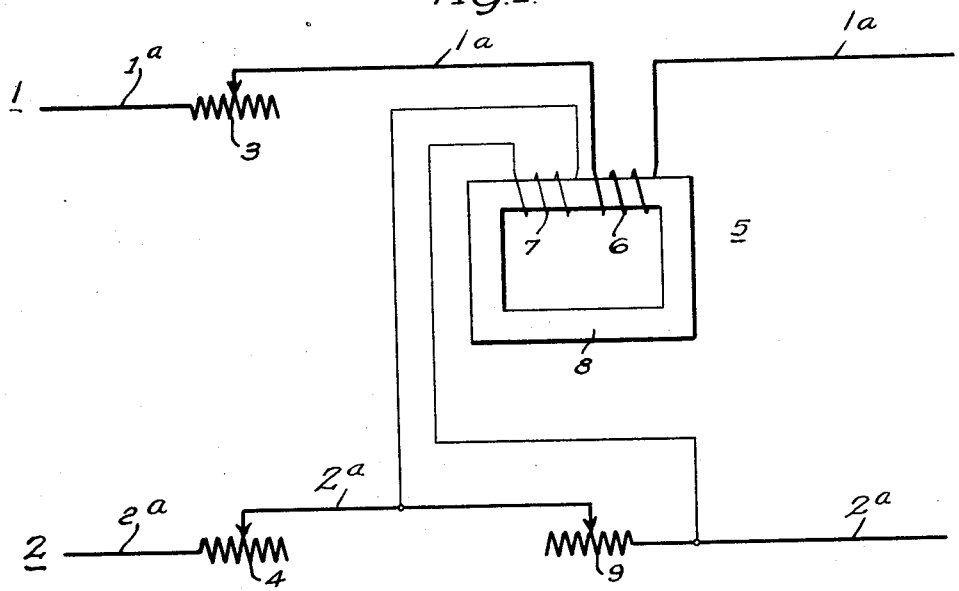
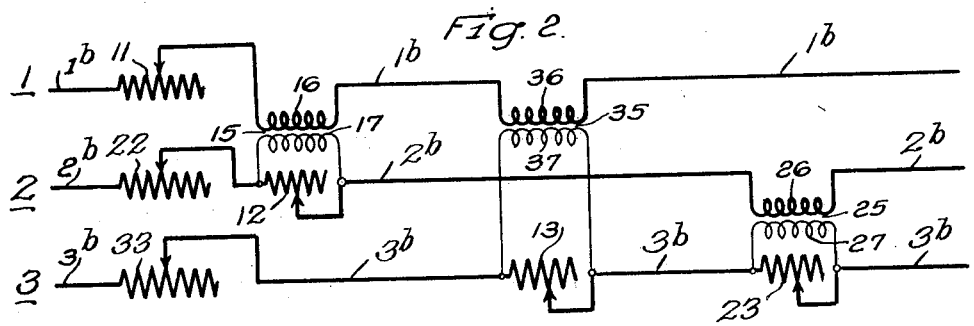
INVENTOR
Charles F. Wagner.
BY Wesley G. Carr
ATTORNEY Patented Oct. 25, 1932

1,884,419

UNITED STATES PATENT OFFICE

CHARLES F. WAGNER, OF SWISSVALE, PENNSYLVANIA, ASSIGNOR TO WESTINGHOUSE ELECTRIC & MANUFACTURING COMPANY, A CORPORATION OF PENNSYLVANIA

MEANS FOR SIMULATING MUTUAL IMPEDANCES

Application filed April 11, 1929. Serial No. 354,236.

My invention relates to calculating boards and more particularly to a board for calculating the quantities and characteristics of alternating-current systems.

My invention has for an object to provide a method of, and means for, simulating, on a calculating board, the mutual impedance existing between the circuit conductors of an alternating-current transmission line.

In alternating-current transmission lines, self-impedance exists in each of the different circuits and also mutual impedance between the circuit conductors. In electric-railway systems the self-impedance and mutual impedance exist in and between the feeder conductors, the trolley wire and the tracks. The problem of calculating current flow in these networks is much simplified by the use of miniature circuits that are provided with means for simulating the electrical characteristics of the various sections of the system. Such miniature circuits are associated with the calculating board to provide means for solving network problems when the network is subjected to various conditions, such as short circuits.

Mutual inductances or reactances may be represented in miniature by the usual means of disposing two coils in inductive relation, and the value of the mutual inductance may be varied by changing the number of turns on the two coils, by changing the relative positions, thereof, or by altering the leakage in some manner. These methods have been found undesirable for use in connection with calculating boards because of the very complicated structure involved and the difficulty of manipulation because of the corrective factor necessary for the self-impedance due to changes in mutual impedance. By my invention, I propose an entirely new method for representing the actual system by means of self-impedances and transformers in which the leakage is negligible.

My device duplicates, in miniature circuits, the mutual inductance or impedance that exists between the power-transmission circuits, whereby the operating characteristics of the latter may be accurately determined.

In general, having given two mutually coupled circuits with constant impedances, which, of course, excludes saturation effects, their characteristics may be defined as follows:

The voltage in one of the circuits is equal to the product of the self-impedance of that circuit by the current through it plus the product of the mutual impedance between the two circuits by the current through the second circuit. Similarly, the voltage of the second circuit is equal to the product of the mutual impedance between the circuits by the current through the first circuit plus the product of the self-impedance of the second circuit by the current through the second circuit.

It is then only necessary, for any other circuit to represent the given circuit, that the mutual and self-impedances be equal.

My invention may be more readily understood if the accompanying drawing is consulted in connection with the following description.

Fig. 1 is a diagrammatic representation of a mutual-impedance-simulating device constructed in accordance with my invention.

Fig. 2 is a diagrammatic representation of my device applied to a plurality of circuits.

Two separate alternating-current circuits 1 and 2, comprising conductors $1a$ and $2a$, respectively, in Fig. 1, are designed to represent corresponding circuits of an alternating-current transmission line or the feeder and the trolley of an electric railway. A variable impedance 3 is connected in series relation with the circuit 1, its value being made equal to the self impedance of the transmission circuit to be simulated minus the mutual impedance between that transmission circuit and an adjacent circuit, simulated by the circuit 2. A similar impedance 4 is connected in series relation with the circuit 2 and is given a value in accordance with mutual and self-impedance values, as in the case of the impedance 3.

A current transformer 5, comprising a primary winding 6 and a secondary 7 wound on a core 8 of magnetizable material, is provided for effecting mutual impedance or inductance between the circuits 1 and 2. For this purpose, the primary winding 6 is connected in series with the circuit 1, and the secondary winding 7 is connected across a variable impedance 9 that is connected in series with the circuit 2.

The ratio between the primary and secondary windings 6 and 7 of the transformer 5 is preferably 1:1, although any other convenient ratio may be used, provided the associated impedances are chosen to correspond. Also, the transformer is so constructed that the leakage between the windings is practically negligible. The iron losses of the transformer result in an equivalent resistance that may be divided in equal parts between the two coils of the transformer. It is desirable that such resistance be as small as possible, and the magnetic circuit of the transformer, therefore, should comprise a material having desired magnetic characteristics, such as an alloy of iron and nickel.

It is apparent that the current flowing in the primary winding 6 induces a voltage in the secondary winding 7 which causes a current to flow through the impedance 9. The magnitude of the latter controls the value of the current therethrough and, therefore, the mutual impedance.

The voltage of the circuit 1 is equal to the product of the current therein and the value of the impedance 3 plus the product of the current in the circuit 2 and the mutual impedance produced by the impedance 9.

As outlined above:

$$E_1 = Z_{11} I_1 + Z_{12} I_2 \quad (1)$$
$$E_2 = Z_{12} I_1 + Z_{22} I_2 \quad (2)$$

in which, $E_1$ and $E_2$ are the voltages across the terminals of circuits 1 and 2, respectively, $I_1$ and $I_2$ are the currents in circuits 1 and 2 respectively,
$Z_{11}$ = the self-impedance of circuit 1,
$Z_{22}$ = the self-impedance of circuit 2, and
$Z_{12}$ = mutual impedance between circuits 1 and 2.

Now where
$Z_1$ = value of impedance 3,
$Z_2$ = value of impedance 4, and
$Z_m$ = value of impedance 9,
then $$E_2 = Z_2 I_2 + Z_m (I_2 + I_1) = (Z_2 + Z_m) I_2 + Z_m I_1 \quad (3)$$

Since I have made
$$Z_2 = Z_{22} - Z_m, \quad (4)$$
then
$$E_2 = Z_{22} I_2 + Z_m I_1 \quad (5)$$

Similarly,
$$E_1 = Z_1 I_1 + Z_m (I_2 + I_1) = (Z_1 + Z_m) I_1 + Z_m I_2 \quad (6)$$

and since
$$Z_1 = Z_{11} - Z_m \quad (7)$$

then I may write
$$E_1 = Z_{11} I_1 + Z_m I_2 \quad (8)$$

The two equations (5) and (8), therefore, are identical with the two previous equations (1) and (2) and, since they have the same coefficient, this network completely defines the given network for a given condition.

Since equations (5) and (8) are the same as those developed by the mutual impedance of two alternating current power circuits, i. e., equations (2) and (1), respectively, it follows that the combination of impedances and the current transformer give a mutual impedance between the circuits 1 and 2 that is equivalent to the mutual impedance developed by the alternating-current power circuits to be simulated.

Fig. 2 shows the application of my device to a plurality of circuits. The circuits 1, 2 and 3, comprising the conductors $1b$, $2b$, and $3b$, respectively, are provided with variable impedances 11, 22 and 33, respectively. A current transformer 15 has its primary winding 16 connected in series relation with the circuit 1 and its secondary winding 17 connected across a variable impedance 12 in series relation with the circuit 2. Another current transformer 35 has its primary winding 36 connected in series-circuit relation with the circuit 1 and its secondary winding 37 connected across a variable impedance 13 in series relation with the circuit 3. In a similar manner, a current transformer 25 has its primary winding 26 connected in series-circuit relation with the circuit 2 and its secondary winding 27 connected across a variable impedance 23 that is, in turn, connected in series-circuit relation with the circuit 3.

Assuming that $Z_1$, $Z_2$ and $Z_3$ = impedances of 11, 22 and 33, respectively, $Z_{12}$, $Z_{23}$ and $Z_{13}$ = impedances 12, 23 and 13, respectively, $I_1$, $I_2$ and $I_3$ = currents through circuits 1, 2 and 3 respectively, and $E_1$, $E_2$ and $E_3$ = voltage of circuits 1, 2 and 3 respectively; if these circuits are solved in a manner similar to that for two complete circuits, we have $$E_1 = Z_1 I_1 + Z_{12}(I_1 + I_2) + Z_{13}(I_1 + I_3) \quad (9)$$
$$E_1 = (Z_1 + Z_{12} + Z_{13}) I_1 + Z_{12} I_2 + Z_{13} I_3 \quad (10)$$
$$E_2 = Z_{12} I_1 + (Z_2 + Z_{12} + Z_{23}) I_2 + Z_{23} I_3 \quad (11)$$
$$E_3 = Z_{13} I_1 + Z_{23} I_2 + (Z_3 + Z_{13} + Z_{23}) I_3 \quad (12)$$

The general equations, representing the characteristics of any three associated circuits are:

$$E_1 = Z_{11} I_1 + Z_{12} I_2 + Z_{13} I_3 \quad (13)$$
$$E_2 = Z_{12} I_1 + Z_{22} I_2 + Z_{23} I_3 \quad (14)$$
$$E_3 = Z_{13} I_1 + Z_{23} I_2 + Z_{23} I_3 \quad (15)$$

where
$Z_{11}$ = the self-impedance of circuit 1.
$Z_{22}$ = the self-impedance of circuit 2.
$Z_{33}$ = the self-impedance of circuit 3.

$Z_{12}$ = the mutual impedance between circuits 1 and 2.
$Z_{13}$ = the mutual impedance between circuits 1 and 3.
$Z_{23}$ = the mutual impedance between circuits 2 and 3.

So that if $$Z_1 = Z_{11} - Z_{12} - Z_{13} \quad (16)$$
$$Z_2 = Z_{22} - Z_{12} - Z_{23} \quad (17)$$
$$Z_3 = Z_{33} - Z_{13} - Z_{23} \quad (18)$$

then the equations (10), (11) and (12) will be identical with the equations (13), (14) and (15).

It is obvious, from the above explanation, that, by the use of my device, the simulation of the mutual inductance or impedance between a plurality of alternating-current circuits in an alternation-current calculating board is made possible, and, so far as I am aware, this function is not possible with calculating boards heretofore employed. It should also be understood that the impedances, as set up in any calculating board, need not be equal to the values in the actual system but a certain predetermined ratio between all the impedances (actual and calculating board values) must be maintained. It is further understood that I am attempting to simulate only normal steady conditions; the transient conditions not being germane to the problem.

I claim as my invention:

1. An alternating-current circuit including an impedance and a transformer having its primary winding in series relation therewith, and a second alternating-current circuit including two separate impedances in series relation therein, the secondary winding of said transformer being connected across one of said impedances in said second circuit.

2. Means for simulating electrical conditions existing in a transmission system, comprising a plurality of circuits, a plural winding transformer, one winding thereof being connected in series relation in one of said circuits, an impedance means serially-connected in another of said circuits, and another of said transformer windings connected across said impedance.

3. An alternating-current calculating board for simulating electrical conditions existing in a transmission system, including in combination, a plurality of circuits, impedance means serially connected in each of said circuits, transforming means associated with said circuits, one winding of said transforming means being serially connected in one of said circuits, another impedance means in another of said circuits, and another winding of said transforming means connected across said last-mentioned impedance means.

4. In combination, a plurality of impedance circuits, transforming means electrically associated with said circuits, the primary winding of said transforming means being connected in series relation in one of said impedance circuits and the secondary winding of said transforming means being connected in parallel with a portion of another of said impedance circuits.

5. In combination, a plurality of impedance circuits, means for varying the impedance characteristics of said circuits and means for inductively coupling said circuits, said inductive coupling means including transforming means having one winding thereof connected in series relation in one of said circuits and another winding thereof connected in parallel with a portion of another of said circuits.

6. The combination with a plurality of impedance circuits, of means for effecting a mutual-impedance effect between said circuits, including a plurality of transforming means each having a primary winding and a secondary winding, the primary winding of each thereof being connected in series relation in some of said circuits, a plurality of impedance means connected in series relation in other of said circuits and each in parallel relation with a secondary winding of one of said transforming means.

7. The combination with two impedance circuits, of means for effecting a mutual-impedance effect between said circuits, including a transforming means having a primary winding and a secondary winding, the primary winding being connected in series relation in one of said circuits, a variable impedance means connected in series relation in the other of said circuits, and a second variable impedance means connected in series relation in said other of said circuits and in parallel with the secondary winding of said transforming means.

8. The combination with two impedance circuits, of means for effecting a mutual-impedance effect between said circuits, including a transforming means having a primary winding and a secondary winding, the primary winding being connected in series relation in one of said circuits, and a variable impedance connected in series relation in the other of said circuits and in parallel relation with the secondary winding of said transforming means.

9. The combination with two impedance circuits, of means for effecting a mutual-impedance effect between said circuits, including a transforming means having a primary winding and a secondary winding, the primary winding being connected in series relation in one of said circuits, a variable impedance means connected in series relation in each of said circuits, and a second variable impedance means connected in series relation in the other of said circuits and in parallel relation with the secondary winding of said transforming means.

10. In a calculating device, means for simulating characteristics and conditions existing in an electrical transmission system, said means including transforming means having a plurality of windings, a plurality of impedance means each connected in series-circuit relation with a different one of said windings, and an impedance means connected in parallel-circuit relation with one of said windings.

11. In a calculating device, means for simulating characteristics and conditions existing in an electrical transmission system, said means including a transforming means having a plurality of windings, a plurality of variable impedance means each connected in series-circuit relation with a different one of said windings and a variable impedance means connected in parallel-circuit relation with one of said windings.

In testimony whereof, I have hereunto subscribed my name this 28th day of March, 1929.

CHARLES F. WAGNER.